United States Patent
Soga et al.

(10) Patent No.: US 7,213,802 B2
(45) Date of Patent: May 8, 2007

(54) CLOSED END TYPE COILED SPRING WITH REDUCED INITIAL DEFLECTION

(75) Inventors: Eiichi Soga, Kanagawa (JP); Yoshiaki Arai, Shizuoka (JP); Keisuke Yokota, Kanagawa (JP); Yasuhiro Saito, Kanagawa (JP)

(73) Assignees: Neturen Co., Ltd., Tokyo (JP); Tokyo Hatsujyo Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/502,402

(22) PCT Filed: Dec. 27, 2002

(86) PCT No.: PCT/JP02/13742

§ 371 (c)(1),
(2), (4) Date: Jul. 26, 2004

(87) PCT Pub. No.: WO2004/061325

PCT Pub. Date: Jul. 22, 2004

(65) Prior Publication Data

US 2005/0218572 A1    Oct. 6, 2005

(51) Int. Cl.
    *F16F 1/12*        (2006.01)
(52) U.S. Cl. .................... 267/167; 267/287; 267/177

(58) Field of Classification Search ............... 267/89, 267/105, 166, 167, 169, 170, 177, 178, 179, 267/286, 287, 33, 174, 175; 5/655.7, 655.8
See application file for complete search history.

(56) References Cited

U.S. PATENT DOCUMENTS

| | | | | |
|---|---|---|---|---|
| 3,141,660 A | * | 7/1964 | Clarke et al. | 267/166 |
| 3,169,757 A | * | 2/1965 | Roder et al. | 267/177 |
| 4,886,256 A | * | 12/1989 | Nishiyama et al. | 267/221 |
| 6,237,901 B1 | * | 5/2001 | Bianchi | 267/33 |
| 6,789,790 B2 | * | 9/2004 | Speckhart et al. | 267/169 |

FOREIGN PATENT DOCUMENTS

| | | | |
|---|---|---|---|
| FR | 2550295 A1 | * | 2/1985 |
| JP | 50022180 A | * | 3/1975 |
| JP | 56-35829 | | 4/1981 |
| JP | 56046128 A | * | 4/1981 |
| JP | 55-188137 | | 7/1982 |
| JP | 02304228 A | * | 12/1990 |
| JP | 10281197 A | * | 10/1998 |

* cited by examiner

*Primary Examiner*—Thomas Williams
(74) *Attorney, Agent, or Firm*—Sughrue Mion, PLLC

(57) ABSTRACT

In a coil spring of closed-end type, the coil spring is characterized in that a coupler is fixedly mounted between: an outer peripheral surface of a terminal convolution of a coil element rod; and, an outer peripheral surface of a subsequent convolution subsequent to the terminal convolution of the coil spring of closed-end type, whereby an amount of initial deflection is decreased.

3 Claims, 4 Drawing Sheets

FIG. 3(a) (PRIOR ART)
FIG. 3(b) (PRIOR ART)
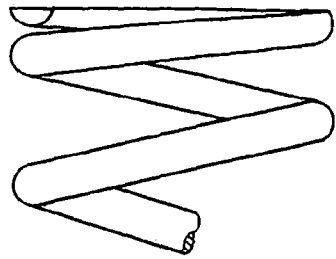
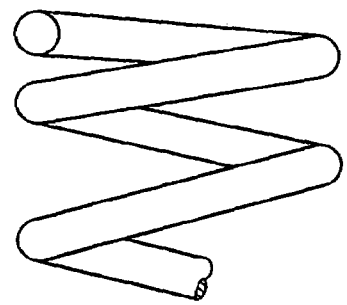
FIG. 4(a) (PRIOR ART)
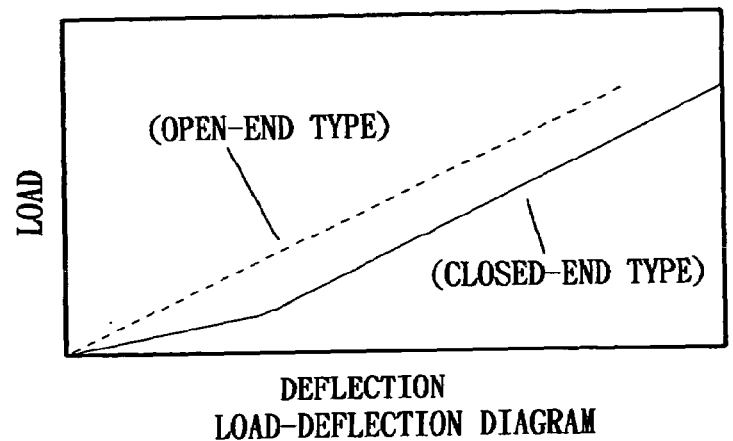
LOAD-DEFLECTION DIAGRAM
FIG. 4(b) (PRIOR ART)
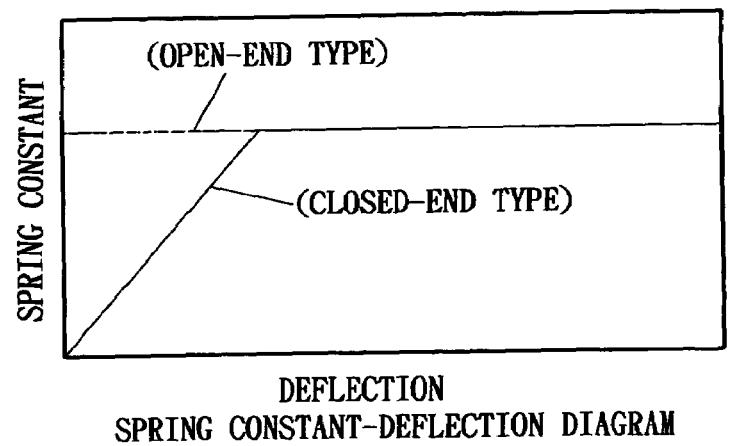
SPRING CONSTANT-DEFLECTION DIAGRAM

LOAD-DEFLECTION DIAGRAM

SPRING CONSTANT-DEFLECTION DIAGRAM

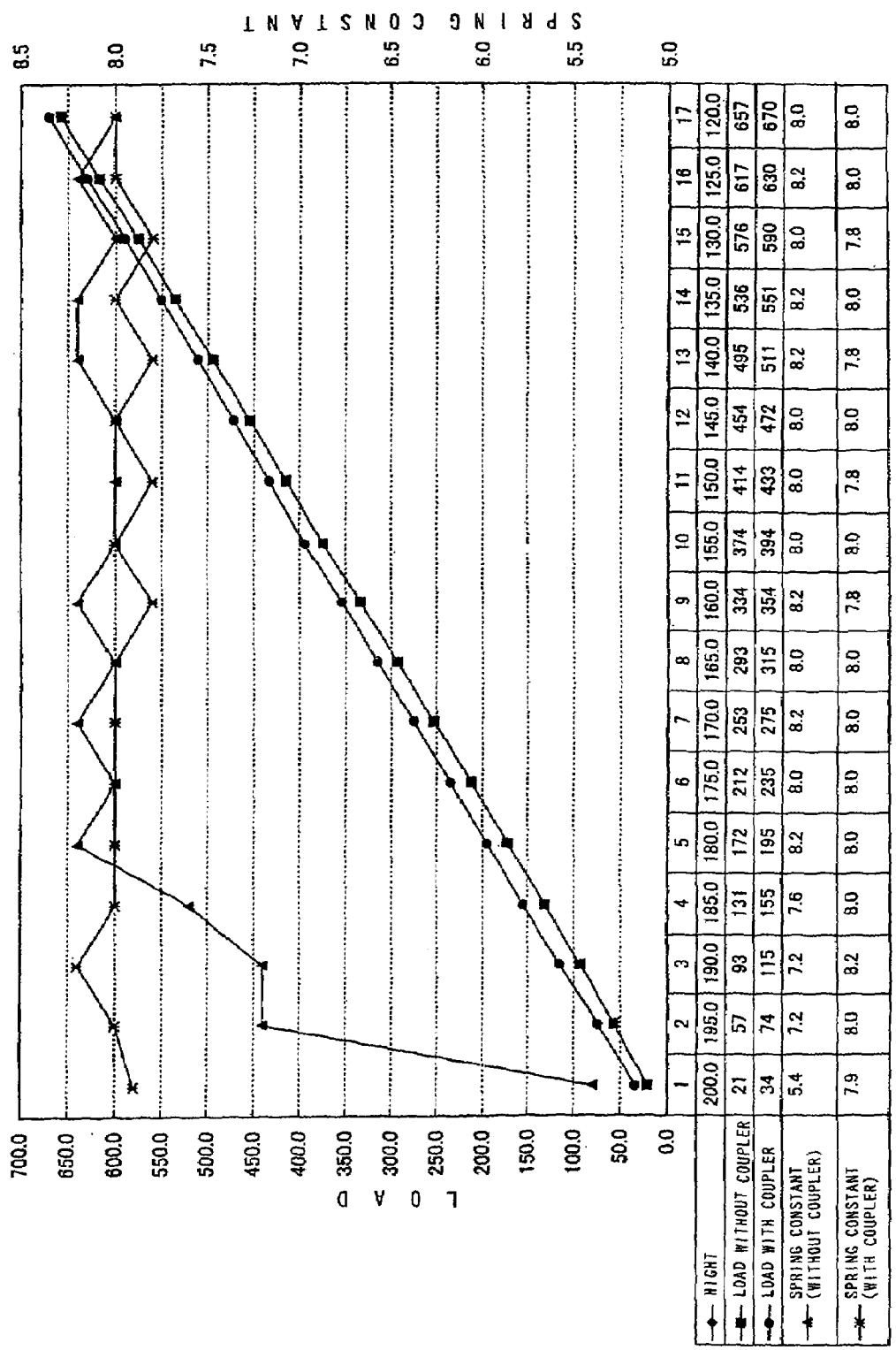

CLOSED END TYPE COILED SPRING WITH REDUCED INITIAL DEFLECTION

TECHNICAL FIELD

The present invention relates to a coil spring used in a buffer spring and like components of an automobile.

BACKGROUND ART

In order to improve an automobile and a bicycle in riding comfort in response to a road condition, a large number of inventions have been disclosed with respect to a coil spring for supporting a vehicle body. For example, in a coil spring described in both Japanese Utility Model application Laid-open No. Sho 56-20140 and Japanese Patent Publication No. Hei 2-22252, an elastic spacer is mounted in an intermediate portion of a coil element rod of the coil spring in order to change a coil constant in response to a road condition.

In a coil spring described in Japanese Utility Model application Laid-open No. Sho 57-113739, a coiled spacer provided with an appropriate number of convolutions is inserted into a proximal terminal portion of the coil spring, so that the number of effective or active convolutions of the coil spring is changed so as to change the coil spring in its coil constant.

Further, a coil spring described in Japanese Patent application Laid-open No. Hei 6-42563 relates to a wearing washer for preventing the coil spring from inclining due to its buckling when the coil spring is of an open-end type.

In contrast with these coil springs, the present invention improves a coil spring in spring properties by decreasing an amount of initial deflection, wherein the initial deflection is a problem inherent in a coil spring of a closed-end type as described later.

Coil springs used in a buffer spring and like components of an automobile are classified into: a coil spring of closed-end type as shown in FIG. 3(a), wherein a terminal portion of the coil spring is subjected to a flattening process; and, a coil spring of open-end type as shown in FIG. 3(b), wherein a terminal portion of the coil spring is constructed of a part of an active convolution of the coil spring.

In the case of the coil spring of open-end type shown in FIG. 3(b), when a compression force is applied to the coil spring by using a flat washer, an oblique force which is obliquely directed with respect to a coil axis of the coil spring is developed to have the coil spring inclined under the influence of its buckling caused by such oblique force.

Consequently, this type of the coil spring is disadvantageous in that it is necessary for the coil spring to use a special washer such as one disclosed in the Japanese Patent application Laid-open No. Hei 6-42563. In contrast with this, in the case of the coil spring of closed-end type as shown in FIG. 3(a), even when a flat washer is used, it is possible for the flat washer to apply a force uniformly to the coil spring in axial direction thereof without using any special washer. Consequently, in this respect, the coil spring of such closed-end type is advantageous.

In the case where a compression force is applied to the coil spring: when the coil spring is of the open-end type, as shown in dotted line of FIG. 4(a), a plot of the coil spring of the open-end type forms a straight line from its starting point in a load-deflection diagram of FIG. 4(a). As for the spring constant too, as shown in dotted line of FIG. 4(b), a plot of the coil spring of the open-end type forms a straight line from its starting point in a coil spring-deflection diagram of FIG. 4(b). In contrast with this, in the case of the coil spring of closed-end type, as shown in solid line of FIG. 4(a): a terminal portion of the coil element rod of the coil spring is initially deflected under a relatively light load since such terminal portion of the coil spring of the closed-end type is smaller in cross-sectional area than any one of active convolution portions of the same coil spring; and, after that, a plot of the coil spring of the closed-end type reaches its predetermined consistent form in the load-deflection diagram of FIG. 4(a). As for its spring constant, as shown in solid line of FIG. 4(b), a plot of the coil spring of the closed-end type gradually increases from its stating point, and reaches its consistent value at a completion point of its creeping. In this respect, the coil spring of the closed-end type is disadvantageous. In the present invention, such initial deflection occurring in the coil spring of the closed-end type under the relatively light load is hereinafter referred to as "initial deflection".

In order to avoid the above-mentioned disadvantage inherent in the coil spring of the closed-end type, it is considered that a preliminary load is applied to the coil spring in installation to preliminarily remove the initial deflection of the coil spring from the coil spring's installation height. However, in this method, since the coil spring is substantially decreased in coil height in installation, it is not possible to carry out this method in some application cases. Due to this, a need exists in the art for the coil spring of the closed-end type, which spring is substantially released from a problem of the initial deflection by using a flat washer.

SUMMARY OF THE INVENTION

Consequently, it is an object of the present invention to solve the above problem by providing a coil spring of closed-end type, wherein: the coil spring of the closed-end type is decreased in initial deflection as is in the case of a coil spring of open-end type.

In order to accomplish the above object, the coil spring of the closed-end type decreased in initial deflection according to the present invention is characterized in that a coupler is fixedly mounted between: an outer peripheral surface of a terminal portion of a coil element rod of the coil spring; and, an outer peripheral surface of a convolution of the coil spring, which convolution is subsequent to the terminal portion of the coil element rod.

In other words, in the coil spring of the closed-end type of the present invention: in order to prevent occurrence of the initial deflection which is caused by the fact that the terminal portion of the coil spring of the closed-end type is smaller in cross-sectional area than a normal convolution portion of the coil spring and is therefore initially deflected under a relatively light load smaller than a given load, a force applied to the terminal portion of the coil spring is transmitted to the subsequent convolution of the coil spring by using the coupler, so that the amount of such initial deflection of the coil spring is decreased.

As a result of this, a load-deflection plot and a plot of spring constant of the coil spring of the closed-end type of the present invention each of which plots assumes a shape shown in FIG. 5. In other words, in the coil spring of the present invention, although a slight amount of the initial deflection initially appears as shown in the drawings, such a slight amount of the initial deflection of the coil spring of the present invention is much smaller than the corresponding initial deflection of the conventional coil spring of the closed-end type (see FIG. 4). Consequently, it is possible for the coil spring of the present invention to considerably decrease the amount of the initial deflection thereof. This makes it possible for the coil spring of the present invention to obtain substantially the same spring characteristics as that of the coil spring of open-end type. Further, it is possible for the coil spring of the present invention to use a flat washer as a wearing member for the coil spring. As a result, it is possible for the coil spring of the present invention to reduce its manufacturing cost.

In contrast with the coil spring of the known invention described in the Japanese Utility Model application Laid-open No. Sho57-113739 in which the spacer is inserted into or removed from the coil spring so as to change the number of effective or active convolutions of the coil spring, the present invention has the coupler of its coil spring fixedly mounted on the coil spring at the beginning of its installation in order to keep a spring constant of the coil spring at a consistent value from the beginning of application of a compression force to the coil spring.

The coupler is preferably made of an elastic material. Further, preferably this coupler is made of an elastic material, which is moderate in both hardness and elasticity so as not to damage a coil element rod of the coil spring. Plastics, aluminum alloys, copper alloys and like materials can be used as the material of the coupler. As for a method for fixedly mounting the coupler on the coil spring, it is possible to bond the coupler to the coil spring with the use of an adhesive. Further, it is also possible to fixedly hold the coupler in the coil spring with the use of resiliency of the coil spring.

BRIEF DESCRIPTION OF THE DRAWINGS

FIG. 3 is a view describing both the coil spring of the closed-end type and that of the open-end type;

FIG. 4 is a view illustrating the initial deflection of the coil spring of the conventional closed-end type;

Figure 1:
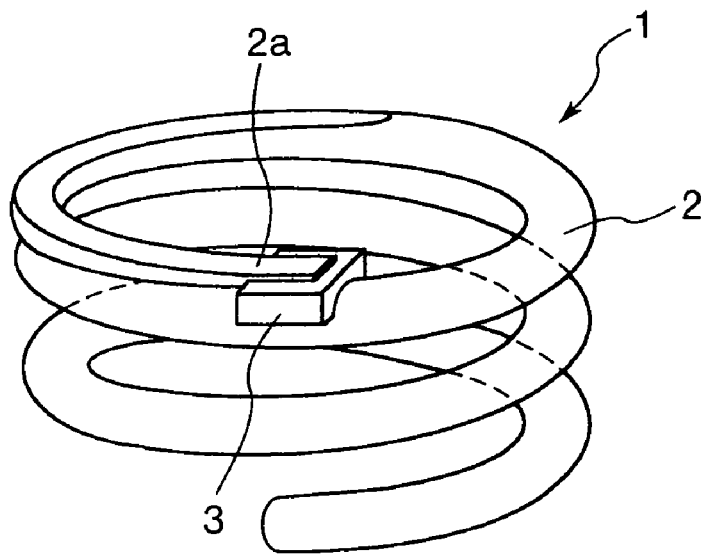
FIG. 1 is a perspective view of the coil spring decreased in its initial deflection according to an embodiment of the present invention.

DESCRIPTION OF THE REFERENCE NUMERALS 1 a coil spring of closed-end type; 2 a coil element rod; and, 3 a coupler.

PREFERRED EMBODIMENT FOR CARRYING OUT THE INVENTION

Figure 2:
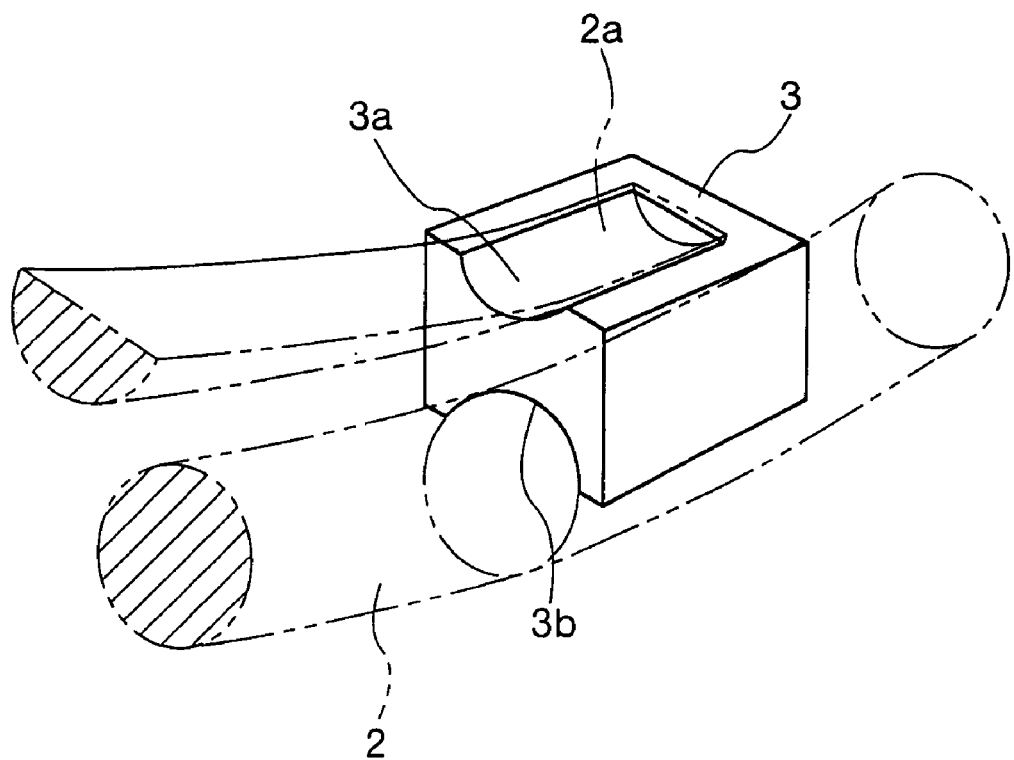
FIG. 2 is a perspective view illustrating an example of the coupler of the present invention.

An embodiment of the present invention, which embodiment is illustrated in the drawings, will be hereinbelow described in a concrete manner. FIG. 1 is a perspective view of a coil spring of closed-end type according to an embodiment of the present invention. FIG. 2 is a perspective view describing an example of a coupler of the present invention.

In FIG. 1, a coil spring of closed-end type of the present invention is constructed of: a coil element rod 2 having each of its opposite coil terminal portions subjected to a surface-flattening process; and, a coupler 3 fixedly mounted on each of the opposite terminal portions 2a of the coil element rod 2, which terminal portions 2a are disposed in the vicinities of opposite ends of the coil element rod 2 (in FIG. 1: only one of the opposite ends of the coil element rod 2 is illustrated; and, the other is not omitted in the drawing.).

As shown in detail in FIG. 2, an example of the coupler 3 of the present invention is constructed of a block which is provided with: a groove 3a having a bottom radius, which radius permits the terminal portion 2a of the coil element rod 2 to be steadily inserted into the groove 3a; and, a groove 3b provided in a rear surface oppositely disposed from the groove 3a in the block, wherein the groove 3b of the block has a bottom radius permitting the block to steadily mount on an outer peripheral surface of a convolution of the coil element rod in a raiding manner, which convolution is disposed axially subsequent to the terminal portion (or convolution) 2a of the coil element rod 2. This makes it possible for the block to keep consistent a clearance between the terminal portion (or convolution) 2a of the coil element rod 2 and the corresponding outer peripheral surface of the axially subsequent convolution of the coil element rod 2 when the coil spring of the present invention is compressed. Preferably, this block is made of a suitable elastic material having a moderate hardness so as not to damage the coil element rod. Due to this, the block may be made of plastics and soft metals both low in hardness. As for a method for fixedly mounting the coupler on the coil spring of closed-end type of the present invention: although it is preferable to have at least one of the grooves 3a, 3b of the coupler 3 is bonded to the coil element rod with the use of an adhesive, it is also possible to fixedly mount the block by a resiliency of the coil spring itself without using any adhesive.

Although the coupler 3 assumes a saddle-backed shape in the embodiment of the present invention so as to permit the coupler 3 to ride on the coil element rod 2 of the coil spring, it is also possible for the coupler 3 to have a through-hole permitting the coil element rod 2 of he coil spring to pass through such through-hole of the coupler 3, and also possible for the coupler 3 to assume any other suitable shape in place of the groove 3b of the block.

Now, the coil spring of the present invention having the above construction will be described in operation. When the coil spring is subjected to a compression force: in case of a coil spring of a conventional closed-end type not provided with any coupler, since a terminal portion 2a of such conventional closed-end type of coil spring is smaller in cross-sectional area than any other convolution portion of the same coil spring, so that the terminal portion 2a of such conventional closed-end type of coil spring is initially deflected and brought into contact with an outer peripheral surface of the subsequent convolution of the coil spring to make it possible for the coil spring to reach its consistent spring constant. Due to this, as shown in FIG. 4 described above, the initial deflection is developed in the conventional closed-end type of coil spring.

Figure 5A:
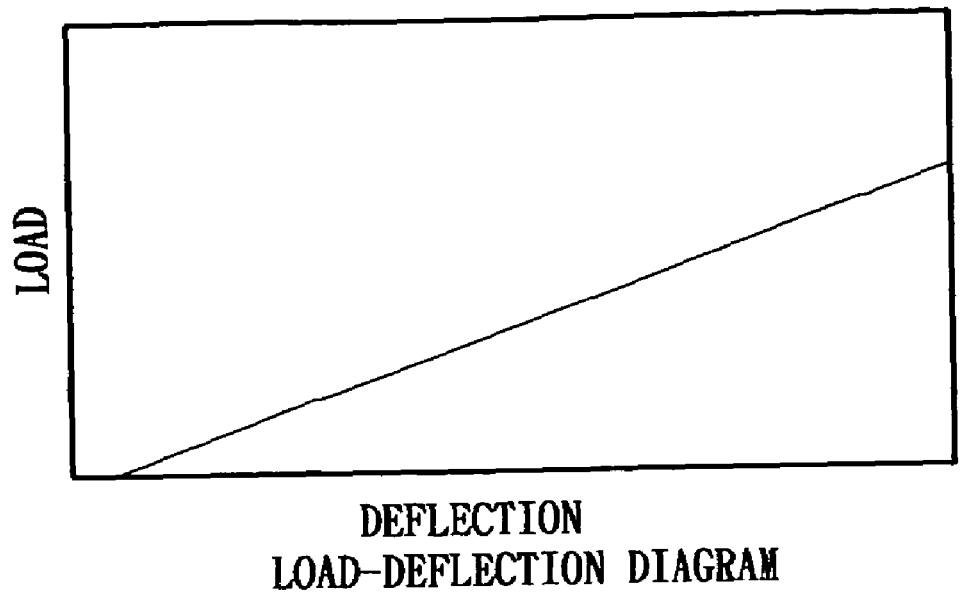
FIG. 5 is a view showing a load-deflection/spring constant diagram of the coil spring of the present invention when the spring is compressed; and, FIG. 6 is a view showing the compression test values of the embodiment of the present invention.
Figure 5B:
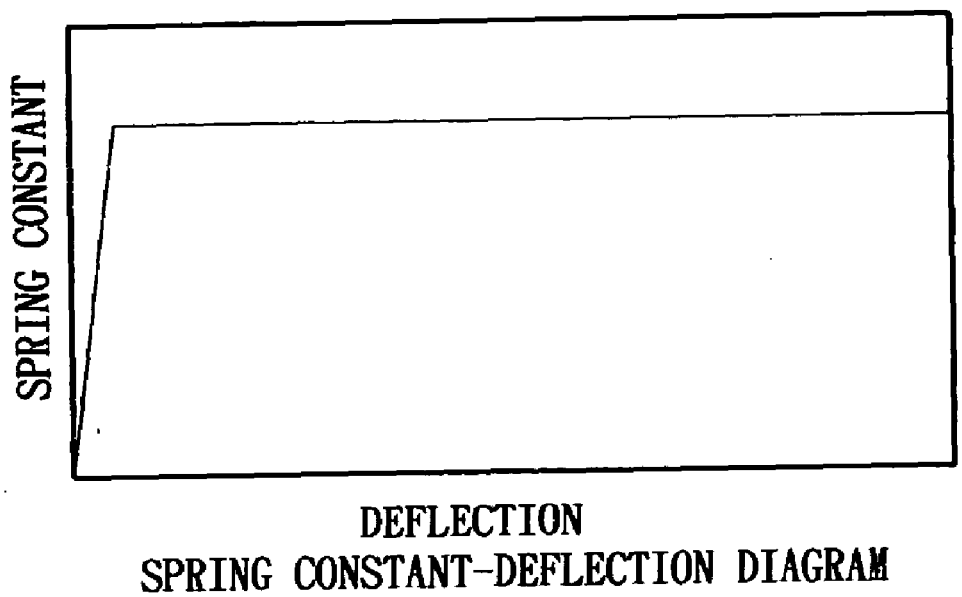

In contrast with this, in case of the coil spring of the present invention: when the coil spring is subjected to a compression force, the compression force applied to the terminal portion 2a of the coil element rod is transmitted to the subsequent convolution through the coupler 3, so that, as shown in FIG. 5, the terminal portion 2a of the coil element rod is substantially not deflected, which makes it possible for the coil spring of the present invention employing the coupler 3 to keep consistent its spring constant from substantially the beginning of its compression process. As shown in FIG. 5, since the initial deflection can be practically neglected in the coil spring of the present invention, it is possible for the coil spring of such closed-end type of the present invention to obtain substantially the same spring characteristics as that of the coil spring of open-end type.

As an example, a coil spring of closed-end type having mechanical properties shown in FIG. 1 were subjected to a series of compression tests in two modes one of which corresponding to the coil spring of the present invention; and, the other corresponds to the conventional coil spring which is not provided with any coupler. The coupler was made of material called "Derlin".

TABLE 1

Mechanical Properties of the Coil Spring thus tested

| Steel Grade | SAE 9254 |
| --- | --- |
| Tensile Strength (N/mm$^2$) | 1.991 |
| Spring Constant (Kg f/mm) | 8.0 |
| Coil Element Rod Diameter (mm) | 11.80 |
| Coil's Outer Diameter (mm) | 88.6 |
| Total Number of Convolutions | 6.85 |
| Free Height (mm) | 203.0 |

The results of the compression tests are shown in FIG. 6. As is clear from the drawing, in the conventional coil spring which is not provided with any coupler: the initial deflection thereof was measured until the coil height of the coil spring reached a value of 185 mm. In contrast with this, in the coil spring of the present invention: when the coil spring having a fee height was compressed by an amount of 3 mm and reached a coil height of 200 mm, the coil spring showed its consistent spring constant. In other words, the coil spring, which is practically and substantially free from the initial deflection, was obtained.

As described above, in the coil spring of closed-end type of the present invention decreased in its initial deflection, the elastic coupler fixedly mounted between: the outer peripheral surface of the terminal convolution of the coil element rod; and, the outer peripheral surface of the subsequent convolution of the same coil element rod, may transmit the compression force applied to the terminal convolution of the coil element rod to the subsequent convolution of the same coil element rod. Consequently, it is possible for the coil spring of the present invention to prevent the initial deflection from being developed during its compression process. The initial deflection is a problem inherent in the closed-end type of the conventional coil spring, because: the conventional coil spring of closed-end type has its coil terminal portion more decreased in cross-sectional area than any other portion of the coil spring in construction; and, is therefore deflected first even when subjected to a smaller force than a given load of the coil spring.

Due to this, it is possible for the coil spring of the present invention, which uses the flat washers but not uses any special washer, to realize substantially the same spring characteristics as that of the coil spring of open-end type provided with the special washers.

Disclosed in the Japanese Utility Model application Laid-open No. Sho 57-113739 is a conventional coil spring of a known invention. This type of conventional coil spring uses a spacer which is detachably inserted between selected adjacent ones of active convolutions of the coil spring in order to change the number of its effective or active convolutions to change a spring constant of the coil spring. In contrast with this, it is an object of the coil spring of the present invention to keep substantially consistent its spring constant from the beginning of application of a given load to the coil spring by fixedly mounting the coupler on the terminal portion of the coil element rod in the vicinities of the opposite end of the coil spring.

As for the coupler, preferably the coupler is provided with a moderate hardness and elasticity so as to prevent the coil element rod of the coil spring from being damaged by the coupler. As for a method for fixedly mounting the coupler on the coil spring, it is possible to employ any suitable method, for example such as: a bonding method in which the coupler is bonded to the terminal portion or convolution of the coil spring through a suitable adhesive applied to the terminal portion of the coil spring; and, a mechanical method in which the coupler is fixedly mounted on the terminal portion or convolution of the coil spring under the influence of a resilient force exerted by the coil spring.

POSSIBILITY IN INDUSTRIAL USE

As described above, in the coil spring of closed-end type of the present invention is decreased in initial deflection: in contrast with the coil spring of open-end type using the special washers, any special washer is not required in the coil spring of the present invention; and, in place of such special washer, a flat washer is used in the coil spring of the present invention. Due to this, it is possible for the coil spring of the present invention to realize substantially the same spring characteristics as that of the coil spring of open-end type. As a result, it is possible for the present invention to increase the application field of the coil spring of closed-end type according to the present invention.

The invention claimed is:

1. In a coil spring of closed-end type, said coil spring is characterized in that a coupler, having a length less than a quarter of a circle of the coil, is fixedly mounted between: an outer peripheral surface of a terminal convolution of a coil element rod of the coil spring of closed-end type, said terminal convolution being partially flattened in cross section through a flattening process; and an outer peripheral surface of a subsequent convolution subsequent to said terminal convolution of the coil spring of closed-end type, so that said coupler is brought into close contact with said outer peripheral surface of each of said terminal convolution and said subsequent convolution of the coil spring of closed-end type, whereby an amount of initial deflection of the coil spring of closed-end type is decreased when the coupler is compressed between the outer peripheral surface of said terminal convolution and the outer peripheral surface of said subsequent convolution, wherein said coupler is fixedly held between the terminal convolution and the subsequent convolution of the coil element rod of the coil spring in an uncompressed state of the coil spring without a gap between the outer peripheral surface of the terminal convolution and a first surface of the coupler and without a gap between the outer peripheral surface of the subsequent convolution and a second surface of the coupler.

2. The coil spring of closed-end type decreased in the amount of initial deflection as set forth in claim 1, wherein said coupler is made of an elastic material.

3. The coil spring of closed-end type in the amount of initial deflection as set forth in claim 1, wherein the first surface and second surface of the coupler are fixedly held in contact with the outer peripheral surface of the terminal convolution and the outer peripheral surface of the subsequent convolution, respectively, by an adhesive.

* * * * *